(12) United States Patent
Chutjian et al.

(10) Patent No.: US 6,583,702 B2
(45) Date of Patent: Jun. 24, 2003

(54) QUADRUPOLE MASS SPECTROMETER DRIVER WITH HIGHER SIGNAL LEVELS

(75) Inventors: Ara Chutjian, La Crescenta, CA (US); Dean Aalami, Irvine, CA (US); Murray Darrach, Arcadia, CA (US); Otto Orient, Glendale, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/165,252

(22) Filed: Jun. 5, 2002

(65) Prior Publication Data

US 2002/0154517 A1 Oct. 24, 2002

Related U.S. Application Data

(62) Division of application No. 09/813,654, filed on Mar. 20, 2001, now Pat. No. 6,434,031, which is a division of application No. 09/392,351, filed on Sep. 8, 1999, now Pat. No. 6,205,043.

(60) Provisional application No. 60/099,630, filed on Sep. 8, 1998.

(51) Int. Cl.[7] .................................................. H01E 27/34
(52) U.S. Cl. ........................................ 336/181; 250/292
(58) Field of Search ........................ 336/181; 250/292; 363/25, 97, 134

(56) References Cited

U.S. PATENT DOCUMENTS

| 4,245,289 | A | | 1/1981 | Mineck et al. |
| 5,426,578 | A | | 6/1995 | Nakamura et al. |
| 5,579,202 | A | * | 11/1996 | Tolfsen et al. ............... 361/232 |
| 6,205,043 | B1 | * | 3/2001 | Chutijian et al. ............. 363/97 |
| 6,211,498 | B1 | * | 4/2001 | Patridge et al. ............. 219/660 |
| 6,434,031 | B2 | * | 8/2002 | Chutjian et al. ............... 363/97 |

* cited by examiner

Primary Examiner—Adolf Deneke Berhane
(74) Attorney, Agent, or Firm—Fish & Richardson P.C.

(57) ABSTRACT

Driving a quadrapole mass spectrometer includes obtaining an air core transformer with a primary and a secondary, matching the secondary to the mass spectrometer, and driving the primary based on first and second voltage levels. Driving of the primary is via an isolating stage that minimizes low level drive signal coupling.

3 Claims, 1 Drawing Sheet

QUADRUPOLE MASS SPECTROMETER DRIVER WITH HIGHER SIGNAL LEVELS

CROSS REFERENCE TO RELATED APPLICATIONS

This application is a divisional of U.S. application Ser. No. 09/813,654, filed Mar. 20, 2001 now U.S. Pat. No. 6,434,031 (allowed), which is a divisional of U.S. application Ser. No. 09/392,351, filed Sep. 8, 1999 (now U.S. Pat. No. 6,205,043), which claims the benefit of U.S. Provisional Application No. 60/099,630, filed on Sep. 8, 1998.

STATEMENT AS TO FEDERALLY SPONSORED RESEARCH

The invention described herein was made in the performance of work under a NASA contract, and is subject to the provisions of Public Law 96-515 (35 U.S.C. 202) in which the Contractor has elected to retain title.

BACKGROUND

Certain applications, including a quadrapole mass spectrometer, can require a specialized power supply.

A power supply for this purpose has specialized requirements. It should be a high frequency power supply that has a variable peak RF amplitude, but is frequency and voltage stable once set. It should also be fully floating. These power supplies should also be capable of driving a primarily capacitive load.

If the device will be operating unattended or in space, the power supply should also be lightweight and efficient.

SUMMARY

The present disclosure teaches a stable, high amplitude, high frequency radio frequency and direct current power supply system. According to one aspect, the system uses a clocked operation to turn on power from a power supply.

A high dynamic range power supply is described that has an oscillator assembly operating from a first power supply and produce first and second out-of-phase, gradually increasing, signals, first and second transistors, coupled to receive said first and second signals respectively, and turned on by the signals to produce an oscillating output. The first transistor produces a first part of the oscillating output and the second transistor produces a second part of the oscillating output. A feedback loop has a detector sensing a level of the oscillating output and producing a signal indicative thereof. A second element compares that signal to a reference and produces an error output indicative of the difference, said error output causing a change in said first and second drive signals. The first transistor is referenced to a second power supply, having a different level than the first power supply.

DETAILED DESCRIPTION

Figure 1:
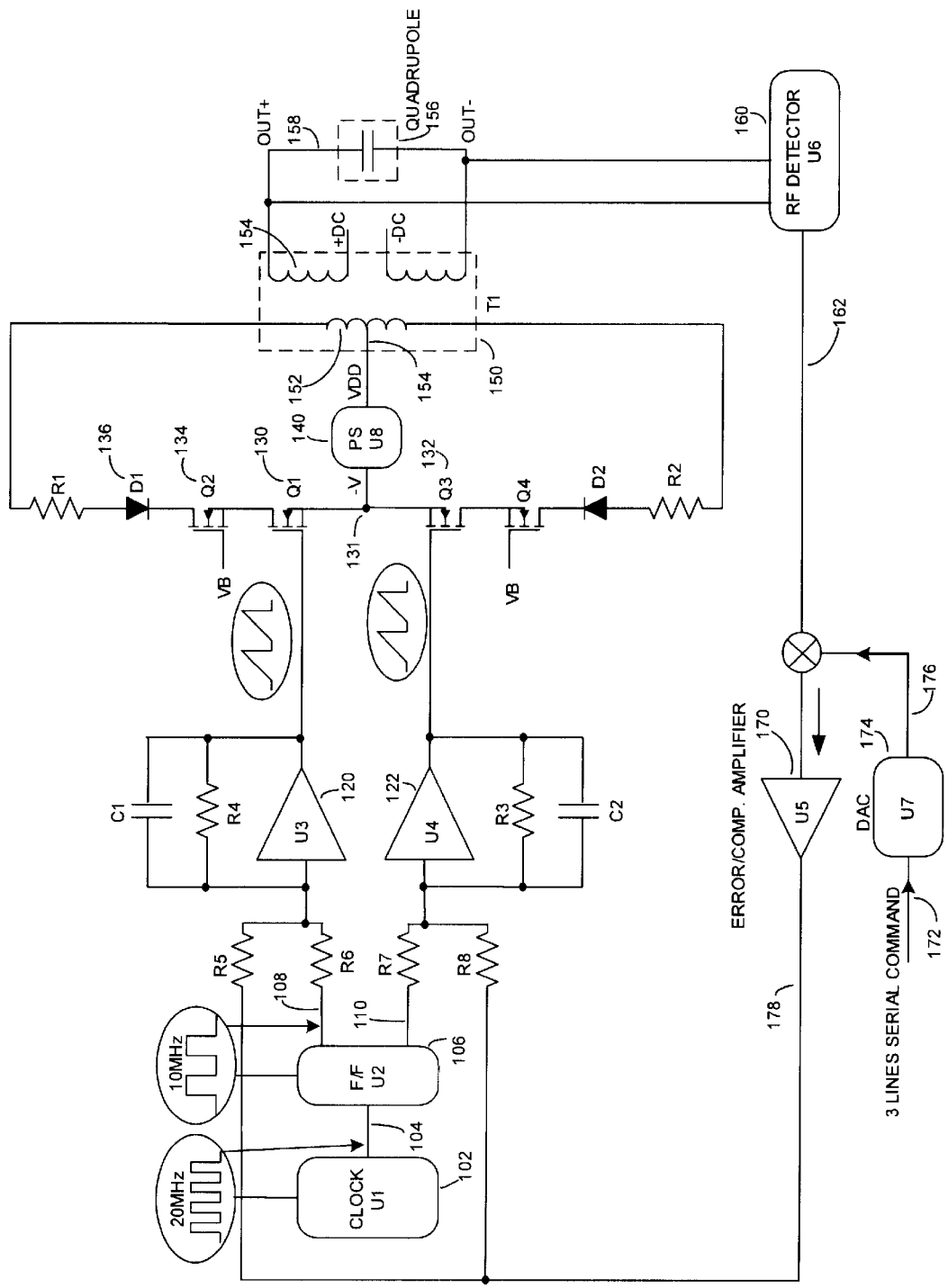
FIG. 1 shows a schematic of the system.

The system is shown in detail in FIG. 1. A clock 102 produces a basic high frequency output 104, here shown as a 20 megahertz clock. It should be understood that any other frequency could be used. A flip flop amplifier 106 divides the oscillating output 104 into two, out-of-phase 10 megahertz signals 108 and 110. The in-phase 10 megahertz signal 108 is taken as a baseline (zero) phase shift, while the out-of-phase 10 MHZ signal 110 is shifted by 180 degrees relative to signal 108.

The output signals 108 and 110 are provided into two analogous, but out-of-phase circuits.

The integrator/summing amplifier 120 is shown as an operational amplifier with a capacitor C1 and resistor R4 in its feedback loop. This effectively changes the square wave output 108 into a gradually increasing signal such as a sawtooth shape having a similar frequency to the driving signal. The sawtooth frequency is applied to the gate of MOSFET 130, and periodically turns on the MOSFET 130. When MOSFET 130 is turned on, it drives current from the power supply 140 to one end of the primary 152 of an air core transformer 150. The return for the power supply 140 is coupled to the center tap 154 of the air core transformer 150. Use of an air core transformer can reduce the weight of the system.

MOSFET 130 begins conducting when the sawtooth level reaches the threshold voltage (Vth) of the MOSFET 130. As the level of the sawtooth increases at the gate of MOSFET 130, the conduction angle increases. As MOSFET 130 turns on more completely, it conducts more current. The phase-shifted signal 110 is analogously coupled through an amplifier 122 to an analogous MOSFET 132. The two circuits operate similarly, but 180 degrees out-of-phase. When MOSFET 130 is in its active phase, MOSFET 132 is off. Conversely, when MOSFET 132 is in its active phase, the MOSFET 130 is off. In this way, the primary 152 of transformer 150 is being alternatively pushed and pulled from opposite directions by two out-of-phase 10 MHZ signals. The output is therefore proportional to the amount of pushing and pulling that occurs.

The secondary 154 of transformer 150 is connected to a load 156 which can be a quadrapole mass spectrometer for example. If a quadrapole mass spectrometer is used, then the inductance of the air core transformer 150 can be adjusted to resonate with a capacitance of the analyzer. The inductance of T1 can be adjusted either mechanically or by changing the windings ratio of the transformer. Use of an air core transformer reduces the weight, and makes it feasible to use such a device. A transformer-coupled output ensures floating output.

The secondary 154 output is also connected to an RF detector 160, which produces a detection signal 162 with a DC level that is proportional to the amplitude of the RF signal 158 produced at the secondary 154 of the transformer 150. The RF detector can include, for example, a rectifying diode. The RF detection signal 162 is coupled to one input of an error amplifier 170. The other input of the error amplifier 170 receives a command 176 indicative of the desired RF level. A serial input command 172 is connected to digital to analog converter 174, which is converted to an analog level 176 indicating the desired level. This analog level 176 is coupled to the second input of error amplifier 170.

The error amplifier 170 produces an error output 178 indicating the difference between the commanded level 172 and the actual level. This difference is coupled through resistors R8 and R5 to the input node of the respective sawtooth amplifiers 120 and 122 where it sums with the flip-flop outputs 108, 110. When the error amplifier output 178 is high, it increases the oscillation signal to a higher level, thereby increasing the drive to the input of the amplifier 120. This effectively produces more conduction from the transistor 130, thereby Increasing the amplitude of the RF signal. The increased-amplitude RF signal is reflected by an increase in the output 162 of the RF detector 160, which hence lowers the error signal 178.

This control loop provides extremely stable RF and DC voltages. Hence, this system can be used for long term unattended operation in a changing external environment, such as in space or under highly variable temperatures.

An important feature of this circuit is its ability to obtain a large dynamic range output signal. At low levels, the drive signal can couple through the gate of the MOSFET, and generate an output signal, which is much greater than the desired minimum signal. In fact, the desired minimum signal for a quadrapole mass analyzer is about that necessary to separate one atomic mass unit. In order to avoid the coupling-through operation, a cascade stage MOSFET 134 is placed in series with a diode 136. The MOSFET is biased to bias level VB. This provides the isolation to avoid the punch through phenomena noted above.

Another problem is based on the characteristics of operational amplifiers that are commonly used for this system. Most operational amplifiers have peak voltages of about 3 to 4 volts for the sawtooth wave produced by the amplifiers. This level might not be high enough to bias the available MOSFETs to drive enough power at the output levels. The peak voltage of the sawtooth is hence increased, by referencing the return of the main power supply to a negative voltage at node 131. By so doing, the peak value seen by the MOSFET is increased by the level of the negative voltage present at the return of the driving power source.

Other embodiments are within the disclosed system.

What is claimed is:

1. A method of driving an air core transformer having a primary and a secondary, the method comprising:

splitting a clock-generated output voltage signal into a plurality of out-of-phase voltage signals;

applying each of the out-of-phase voltage signals differentially to transistors to produce an oscillating signal, wherein each transistor shares a common junction node and, wherein a negative voltage is applied to the transistors at the common junction node to increase a peak value of the signals seen by the respective transistors between the gate terminal and the common junction node of the transistors; and applying the oscillating signal to the primary.

2. The method of claim 1 wherein a first transistor produces a first part of the oscillating signal and a second transistor produces a second part of the oscillating signal, and wherein the first and second parts of the oscillating signal are applied to the primary of the transformer.

3. The method of claim 2 wherein applying a negative voltage to the transistors comprises referencing a return path for a power supply for the air core transformer to a negative voltage at the interconnecting junction node of the transistors, wherein the power supply is connected between the primary of the transformer and the junction node of the transistors.

* * * * *